(12) United States Patent
Cho

(10) Patent No.: US 8,908,108 B2
(45) Date of Patent: Dec. 9, 2014

(54) USER INTERFACE TO CONTROL VIDEO CONTENT PLAY

(71) Applicant: KT Corporation, Seongnam-si, Gyeonggi-do (KR)

(72) Inventor: Young Suk Cho, Seoul (KR)

(73) Assignee: KT Corporation, Seongnam (KR)

( * ) Notice: Subject to any disclaimer, the term of this patent is extended or adjusted under 35 U.S.C. 154(b) by 0 days.

(21) Appl. No.: 14/069,498

(22) Filed: Nov. 1, 2013

(65) Prior Publication Data

US 2014/0118625 A1    May 1, 2014

(30) Foreign Application Priority Data

Nov. 1, 2012  (KR) ........................ 10-2012-0123153

(51) Int. Cl.
| | | |
|---|---|---|
| *H04N 5/44* | (2011.01) | |
| *H04N 9/74* | (2006.01) | |
| *H04N 21/41* | (2011.01) | |
| *H04N 5/445* | (2011.01) | |
| *H04N 21/4402* | (2011.01) | |
| *H04N 21/472* | (2011.01) | |

(52) U.S. Cl.
CPC ......... *H04N 5/4403* (2013.01); *H04N 21/4126* (2013.01); *H04N 5/44513* (2013.01); *H04N 2005/443* (2013.01); *H04N 2005/4408* (2013.01); *H04N 21/440263* (2013.01); *H04N 21/47217* (2013.01)
USPC .......................... 348/734; 348/578; 340/12.54

(58) Field of Classification Search
USPC .............. 348/734, 578, 565, 588, 14.04, 569, 348/570, 564, 584; 715/719–721, 723, 781, 715/864, 833, 834; 725/38; 340/12.54; 386/343, 350, 205, 206, 201; 345/169, 345/619
See application file for complete search history.

(56) References Cited

U.S. PATENT DOCUMENTS

| | | | |
|---|---|---|---|
| 2006/0080716 A1* | 4/2006 | Nishikawa et al. | ............. 725/89 |
| 2009/0064143 A1* | 3/2009 | Bhogal et al. | ................. 718/100 |
| 2009/0116817 A1* | 5/2009 | Kim et al. | ........................ 386/95 |
| 2009/0237562 A1* | 9/2009 | Fujiwara et al. | .............. 348/564 |
| 2009/0249208 A1* | 10/2009 | Song et al. | .................... 715/721 |
| 2011/0055870 A1* | 3/2011 | Yum et al. | ....................... 725/41 |
| 2011/0109800 A1* | 5/2011 | Xiong et al. | .................. 348/565 |
| 2012/0166950 A1* | 6/2012 | Frumar et al. | ................ 715/719 |

FOREIGN PATENT DOCUMENTS

| | | |
|---|---|---|
| KR | 10-2008-0048795 A | 6/2008 |
| KR | 10-2010-0101754 | 9/2010 |
| KR | 10-2011-0134810 | 12/2011 |
| KR | 10-2012-0082223 | 7/2012 |
| KR | 10-1171165 B | 8/2012 |

\* cited by examiner

*Primary Examiner* — Victor Kostak
(74) *Attorney, Agent, or Firm* — Brundidge & Stanger, P.C.

(57) ABSTRACT

In at least one example embodiment, a remote controller includes a pairing unit configured to communicatively pair the remote controller with a television device; a receiver configured to receive, from a content provider, at least one thumbnail image corresponding to video content that is played on the television device; and a display unit configured to display, on a first area, a progress dial and the at least one thumbnail image associated with at least one point in time represented on the progress dial, wherein the at least one thumbnail image is also provided to the television device by the content provider.

20 Claims, 9 Drawing Sheets

710

USER INTERFACE TO CONTROL VIDEO CONTENT PLAY

TECHNICAL FIELD

The embodiments described herein pertain generally to a user interface, which may be hosted and executed on a remote control device, to control video content play on a television device.

BACKGROUND

As mobile communication systems become ubiquitous, video content may be transmitted with descriptive data, and, even while the video content plays, a viewer's smart phone may act as a remote control device.

SUMMARY

In one example embodiment, a system may include a content provider configured to transmit video content and at least one thumbnail image corresponding to the video content; a remote controller configured to: receive the at least one thumbnail image corresponding to the video content from the content provider, display, on a first area, a progress dial, and display the at least one thumbnail image associated with at least one time point on the progress dial; and a television device configured to: receive, from the content provider, the video content and the at least one thumbnail image of the video content, and play the video content, display a progress bar of the video content, and display the at least one thumbnail image associated with at least one time point on the progress bar.

In another example embodiment, a remote controller may include a pairing unit configured to communicatively pair the remote controller with a television device; a receiver configured to receive, from a content provider, at least one thumbnail image corresponding to video content that is played on the television device; and a display unit configured to display, on a first area, a progress dial and the at least one thumbnail image associated with at least one point in time represented on the progress dial. The at least one thumbnail image may be also provided to the television device by the content provider.

In yet another example embodiment, in connection with a remote controller having a user interface, a method may include communicatively pairing the remote controller with a television device; receiving, from a content provider, at least one image of video content that is played on the television device; and displaying, on a first area, a progress dial and the at least one thumbnail image associated with at least one point in time represented on the progress dial. The at least one thumbnail image is also provided to the television device by the content provider.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

Figure 1:
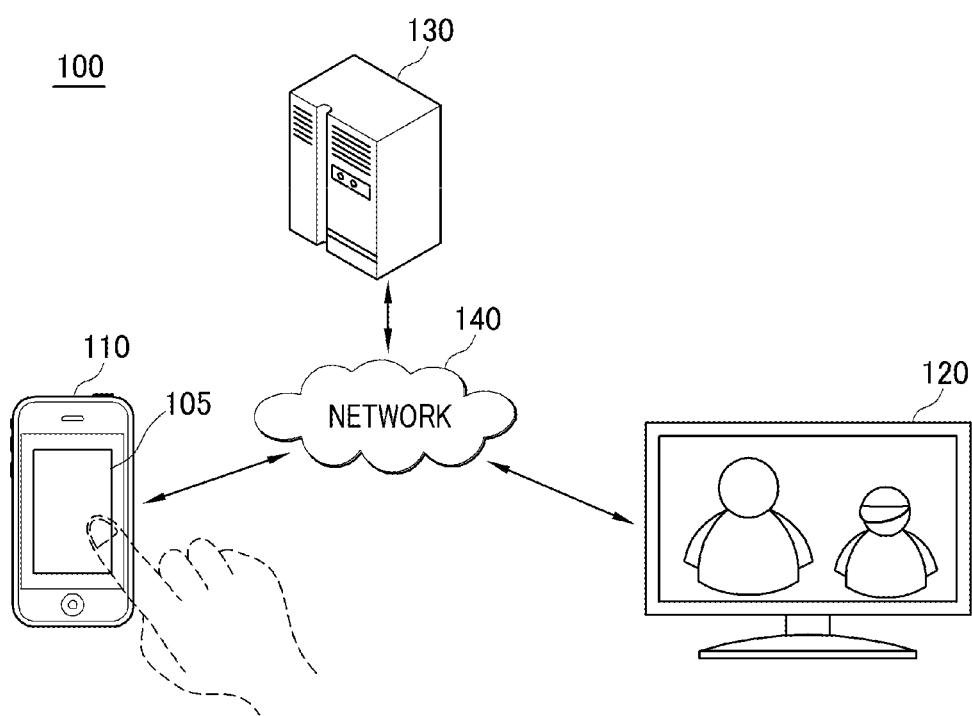
FIG. 1 shows an example system configuration in which a user interface (UI) displayed on a remote controller may control aspects of video content play, in accordance with embodiments described herein.

All of the above may be arranged in accordance with at least some embodiments described herein.

DETAILED DESCRIPTION

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

FIG. 1 shows an example system configuration in which a UI 105 displayed on a remote controller 110 may control aspects of video content play, in accordance with embodiments described herein. As depicted in FIG. 1, system configuration 100 includes, at least, a user interface 105 displayed or otherwise hosted on a remote controller 110, a television device 120 and a content provider 130 that is representative of a server operated by a content provider; one or more of which may be connected to each other via a wireless or a wired network 140.

Remote controller 110 may refer to at least one of a mobile phone, a smart phone, a portable device, a notebook, a personal computer or a personal communication terminal that may be configured to control video control play on television device 120. Non-limiting examples of such remote controller 110 may include PCS (Personal Communication System), GMS (Global System for Mobile communications), PDC (Personal Digital Cellular), PDA (Personal Digital Assistant), IMT (International Mobile Telecommunication)-2000, CDMA (Code Division Multiple Access)-2000, W-CDMA (W-Code Division Multiple Access) and Wibro (Wireless Broadband Internet) terminals.

Remote controller 110 may be configured to host user interface (UI) 105 to control video content played on, e.g., television device 120. That is, via UI 105, remote controller 110 may control various aspects of video content play including, but not limited to, rewind, fast forward, pause, or stop. When UI 105 receives a user input that clicks, selects, or otherwise activates at least one icon displayed on UI 105 hosted on remote controller 110 to control any one of various aspects of the video content play, remote controller 110 may generate and transmit a corresponding control signal to television device 120. If remote controller 110 is communicatively coupled directly to television device 120 via, a near-field communication protocol such as Bluetooth, the control signal may be directly transmitted from remote controller 110 to television device 120. If remote controller 110 is not directly paired or connected to television device 120, the control signal may be transmitted, via content provider 130 and therefore network 140, from remote controller 110 to television device 120.

UI 105 may be hosted and executed on remote controller 110 by installing an application controlling the video content play. By way of example, if the user wants to control the video content play, the user may download the application from virtual application market, such as the Apple™ App Store, the Google™ Google Play, etc.

Television device 120 may refer to an IPTV (internet protocol television), a DTV (digital television), a smart TV, a connected TV or a STB (set-top box). Alternatively, television device 120 may refer to a notebook computer, a personal computer, a smart phone, a tablet computer, a phablet device, or any other type of personal communication terminal that is capable of, at least, receiving and/or playing television content that may be configured to play video content that is selected by the user and received from content provider 130. Further, based on control signals received from UI 105, via remote controller 110, television device 120 may manipulate various aspects of the playing of video content.

Content provider 130 may refer to an Internet service provider (ISP); application service provider (ASP); storage service provider (SSP); and television service provider, i.e., cable TV, DSL and DBS, that may be configured to receive a request for the video content that is selected by the user from television device 120, and to further transmit the requested video content to television device 120. Content provider 130 may be communicatively coupled to both remote controller and television device 120 via network 140.

Network 140, which may be configured to communicatively couple one or more of remote controller 110, television device 120 and content provider 130, may, be implemented in accordance with any wireless network protocol, such as a mobile radio communication network including at least one of a 3rd generation (3G) mobile telecommunications network, a 4th generation (4G) mobile telecommunications network, any other mobile telecommunications networks, WiBro (Wireless Broadband Internet), Mobile WiMAX, HSDPA (High Speed Downlink Packet Access) or the like. Alternatively, network 140 may include at least one of a near field communication (NFC), Bluetooth, radio-frequency identification (RFID) or peer to peer (P2P) communication protocol.

Thus, FIG. 1 shows example system configuration 100 in which UI 105 displayed on remote controller 110 may control aspects of video content play, in accordance with embodiments described herein.

Figure 2:
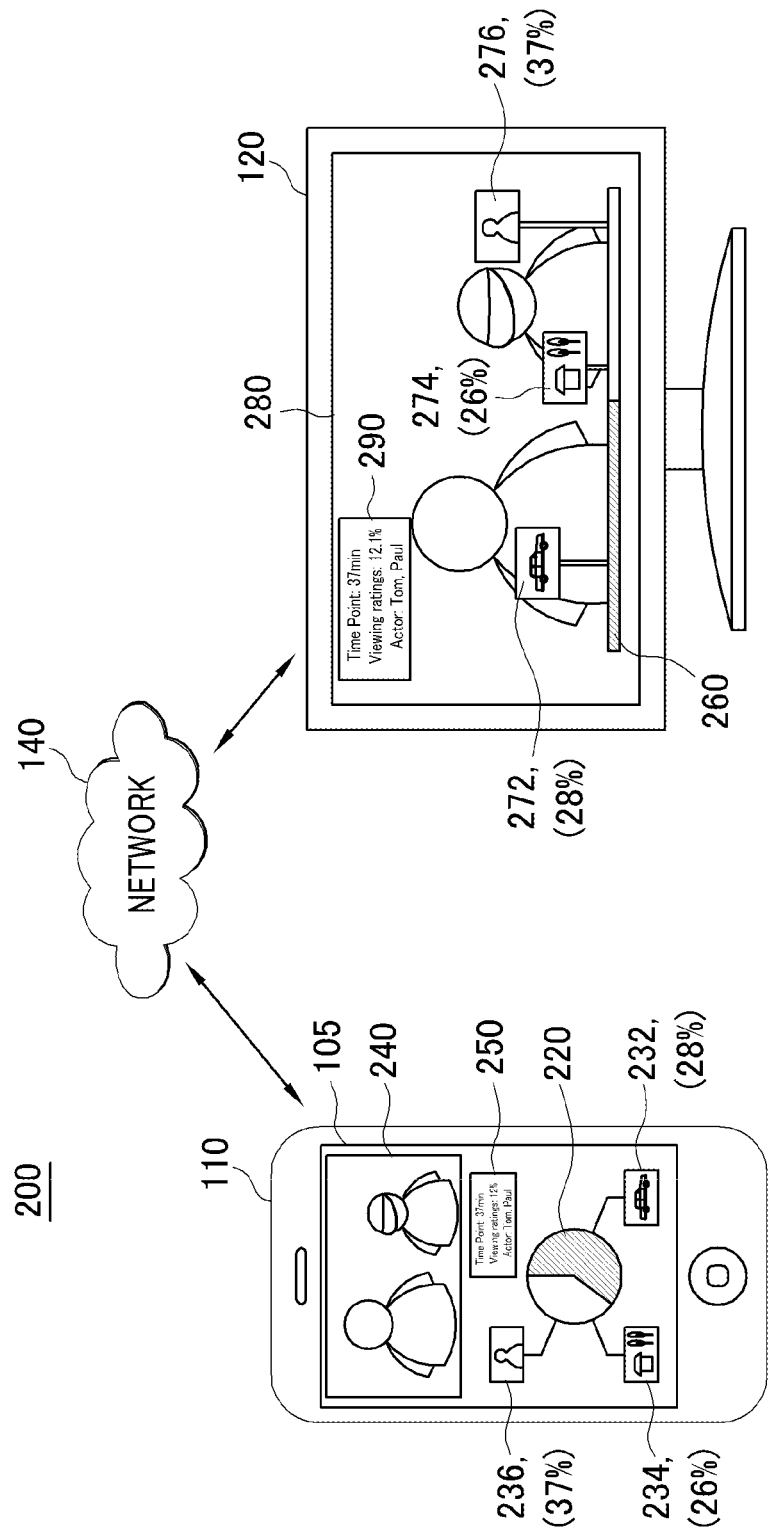
FIG. 2 shows an example configuration of a remote controller interacting with a television device using a UI displayed on the remote controller, in accordance with embodiments described herein.

FIG. 2 shows an example configuration 200 of remote controller 110 interacting with television device 120 using UI 105 displayed on remote controller 110, in accordance with embodiments described herein. As depicted in FIG. 2, UI 105 may be hosted and executed on remote controller 110 and show a progress dial 220, a first thumbnail image 232, a second thumbnail image 234, a third thumbnail image 236, a preview thumbnail 240 and a preview thumbnail information box 250. Further, television device 120 may display a progress bar 260, a first thumbnail image 272, a second thumbnail image 274, a third thumbnail image 276, a preview thumbnail 280 and a preview thumbnail information box 290. Although three thumbnail images 232 to 236 and three thumbnail images 272 to 276 are illustrated in FIG. 2, the number of thumbnail images on remote controller 110 or television device 120 is not limited to three.

As referenced herein, progress dial 220 displayed on remote controller 110 and progress bar 260 displayed on television device 120 both depict the progress of video content currently played on television device 120. That is, progress dial 220 may display a played portion and an unplayed portion of video content. For example, FIG. 2 utilizes a pie-graph representation to distinguish the played portion of the video content from the unplayed portion thereof. Alternative embodiments of progress dial 220 may utilize at least one of a color, saturation, brightness, or patterns to distinguish the played portion to the unplayed portion of video content currently playing on television device 120.

Remote controller 110 may be configured to receive three multiple thumbnail images, e.g., 232 to 236, received from content provider 130, and to display the received thumbnail images on UI 105. As referenced herein, as determined by content provider 130, thumbnail images 232 to 236 may represent most popular three multiple frames from among plural frames shown on the video content. For example, thumbnail images 232 to 236 may be determined based at least in part on the viewing ratings. As referenced herein, the viewing ratings may represent the number of viewers or television devices (including television device 120) that watched or displayed the respective frames of the video content. Further, the viewing ratings may be measured by and received from a research server (not illustrated) operated by a research company, such as, Kantar Media network or Nielsen Media Research.

Further, as depicted in FIG. 2, each of thumbnail images 232 to 236 may be displayed in different sizes. The size of respective ones of thumbnail images 232 to 236 may be determined by remote controller 110 or content provider 130, based at least in part on the viewing ratings. For example, in FIG. 2, first thumbnail image 232 shows viewing ratings of 28%, second thumbnail image 234 shows viewing ratings of 26%, and third thumbnail image 236 shows viewing ratings of 37%, and thus the respective sizes of thumbnail images 232, 234, and 236 are sized in relative proportion.

Further, similarly to progress dial 220, UI 105 may distinguish at least one thumbnail image corresponding to the played portion of the video content from the other(s) thumbnail image(s) corresponding to the unplayed portion thereof.

Preview thumbnail 240 may be shown on video content controlling UI 105. Further, the information regarding preview thumbnail 240 is displayed on preview thumbnail information box 250. The displayed information regarding preview thumbnail 240, by way of example, may include at least one of an identifier for the video content, actors or characters displayed in the video content, the time point and the viewing ratings corresponding to preview thumbnail 240, etc.

When UI 105 receives a user input that clicks, selects or otherwise activates a time point on progress dial 220 of UI 105, remote controller 110 may be configured to transmit, to content provider 130, a request for preview thumbnail 240 corresponding to the clicked, selected or otherwise activated time point. Then, remote controller 110 may receive preview thumbnail 240 from content provider 130 with information regarding preview thumbnail 240.

Television device 120 may be configured to display progress bar 260 representative of playing progress of video content played on television device 120 as progress dial 220 displayed on remote controller 110.

Further, television device 120 may be configured to display three thumbnail images 272 to 276 received from content provider 130. Three multiple thumbnail images 272 to 276 displayed on television device 120 may be corresponding to respective three thumbnail images 232 to 236 displayed on remote controller 110. The size and/or position of thumbnail images 272 to 276 on the display of television device 120 may be determined based at least in part on their viewing ratings. By way of example, the higher viewing ratings a thumbnail image gets, the larger size or the higher position the thumbnail image determined by television device 120 or content provider 130.

As set forth above, when UI 105 receives a user input that clicks, selects, or otherwise activates a particular time point on progress dial 220 displayed on UI 105, television device 120 may be configured to receive, from remote controller 110, preview thumbnail 280 corresponding to the particular time point and information regarding preview thumbnail 280. Thus, television device 120 may display received preview thumbnail 280 and display the information regarding preview thumbnail 280 on preview thumbnail information box 290.

In some embodiments, during playing of the video content, progress bar 260, thumbnail images 272 to 276, preview thumbnail 280 and preview thumbnail information box 290 may not be displayed on television device 120 not to disrupt the playing of the video content.

Thus, FIG. 2 shows an example configuration of a remote controller interacting with a television device using UI 105 displayed on the remote controller, in accordance with embodiments described herein.

Figure 3:
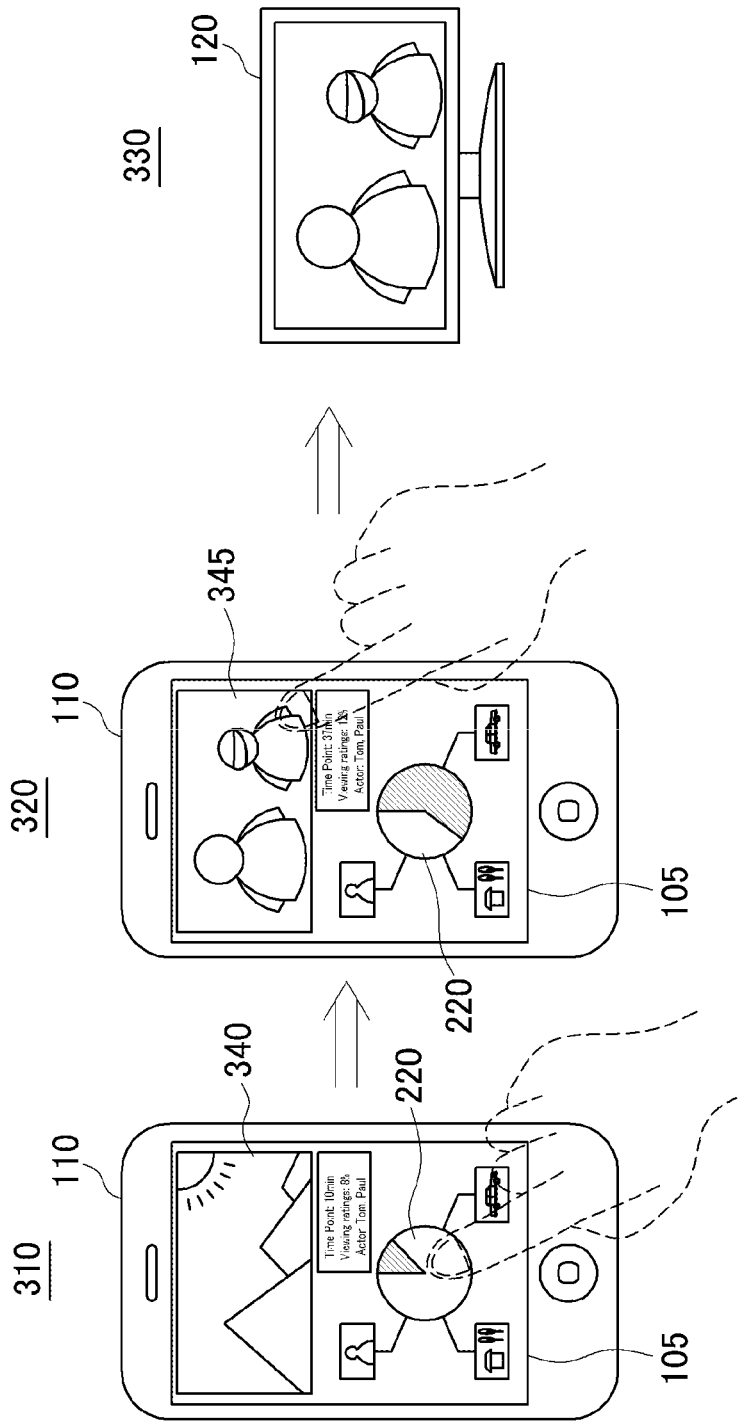
FIG. 3 shows an example processing flow of operations to implement at least portions of video content play control, in accordance with embodiments described herein.

FIG. 3 shows an example processing flow of operations to implement at least portions of video content play control, in accordance with embodiments described herein.

As depicted in the example of FIG. 3, process 310 may refer to remote controller 110 displaying progress dial 220 representing playing progress of the video content in 10 minutes. Further, remote controller 110 displays a preview thumbnail 340 corresponding to the 10 minute mark. When UI 105 receives a user input that clicks, selects, or otherwise activates a time point at 37 minutes, processing may proceed from process 310 to process 320.

Process 320 may refer to remote controller 110 displaying a progress dial 220 representing playing progress of the video content at the 37 minute mark. Further, remote controller 110 may display a preview thumbnail 345 corresponding to the in the Video content at the 37 minute mark with viewing ratings of 12%. When UI 105 receives a user input that clicks, selects, or otherwise activates preview thumbnail 345 displayed on UI 105, processing may proceed from process 320 to process 330.

Process 330 may refer to television device 120 playing from the time point in 37 minutes corresponding to clicked, selected, or otherwise activated preview thumbnail 345.

Thus, FIG. 3 shows an example processing flow of operations to illustrate how at least portions of video content play may be manipulated at a particular time point.

Figure 4:
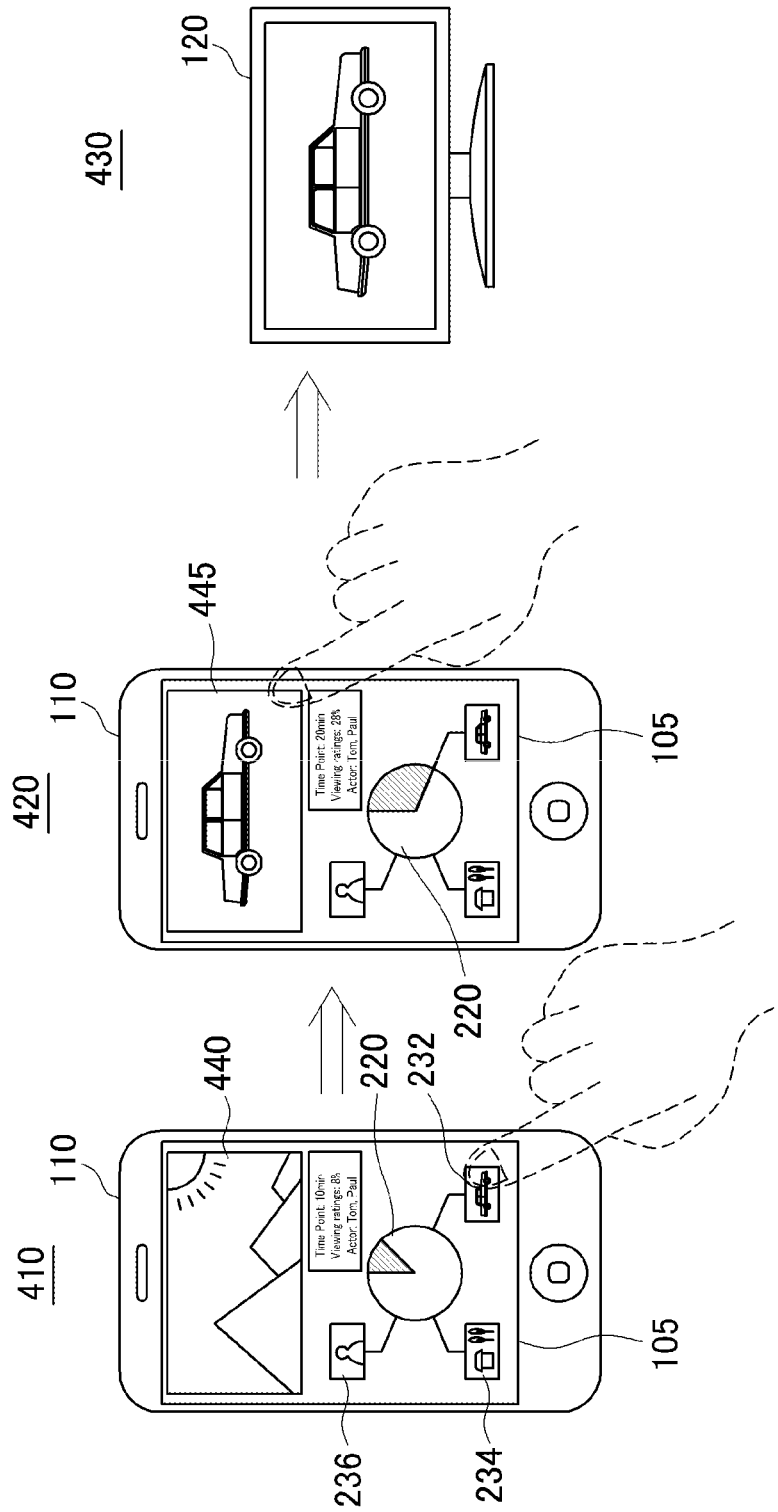
FIG. 4 shows yet another example processing flow of operations to implement at least portions of video content play control, in accordance with embodiments described herein.

FIG. 4 shows yet another example processing flow of operations to implement at least portions of video content play control, in accordance with embodiments described herein.

As depicted in FIG. 4, similar to the description of FIG. 3, process 410 may refer to remote controller 110 displaying progress dial 220 representing playing progress of the video content at the 10 minute mark. Further, remote controller 110 may display thumbnail images 232 to 236 and a preview thumbnail 440 corresponding to the video content at the 10 minute mark. When UI 105 receives a user input that clicks, selects, or otherwise activates first thumbnail image 232 displayed on UI 105, processing may proceed from process 410 to process 420.

Process 420 may refer to remote controller 110 displaying a progress dial 220 representing playing progress of the video content at 20 minutes. Further, remote controller 110 may display a preview thumbnail 445 corresponding to the time point of the video content at 20 minutes. When UI 105 receives a user input that clicks, selects, or otherwise activates preview thumbnail 445, processing may proceed from process 420 to process 430.

Process 430 may refer to television device 120 playing the video content from the time point at 20 minutes corresponding to clicked, selected, or otherwise activated preview thumbnail 445.

In some embodiments, process 420 may be omitted. By way of example, when UI 105 receives a user input that clicks, selects, or otherwise activates first thumbnail image 432, television device 120 may play the video content from the time point corresponding to first thumbnail image 432 without clicking, selecting, or otherwise activating preview thumbnail 445.

Thus, FIG. 4 shows yet another example processing flow of operations to illustrate how at least portions of video content play may be manipulated at a particular time point.

Figure 5:
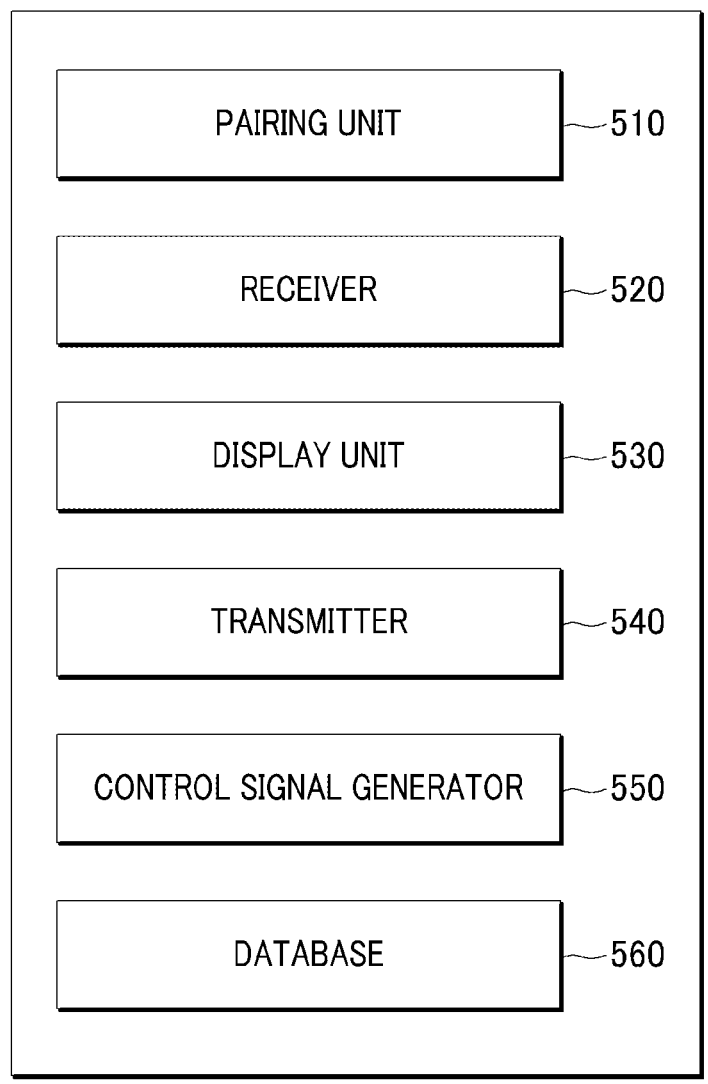
FIG. 5 shows an example configuration of a remote controller on which a UI may control at least portions of video content play, in accordance with embodiments described herein.

FIG. 5 shows an example configuration of a remote controller on which UI 105 may control at least portions of video content play, in accordance with embodiments described herein. As depicted in FIG. 5, remote controller 110, first described above with regard to FIG. 1, may include a pairing unit 510, a receiver 520, a display unit 530, a transmitter 540, a control signal generator 550 and a database 560.

Although illustrated as discrete components, various components may be divided into additional components, combined into fewer components, or eliminated altogether while being contemplated within the scope of the disclosed subject matter. Each function and/or operation of the components may be implemented, individually and/or collectively, by a wide range of hardware, software, firmware, or any combination thereof. In that regard, one or more of pairing unit 510, receiver 520, display unit 530, transmitter 540, control signal generator 550 and database 560 may be included in an instance of an application hosted by remote controller 110.

Pairing unit 510 may be a component or module that is programmed and/or configured to communicatively pair remote controller 110 with television device 120. By way of example, remote controller 110 may be directly paired with television device 120 by using at least one of a near field communication (NFC), Bluetooth, radio-frequency identification (RFID), or peer to peer (P2P) communication protocol. Alternatively, remote controller 110 may be indirectly paired with television device 120, which itself is paired with content provider 130, via network 140, that is connected to television device 120.

Receiver 520 may be a component or module that is programmed and/or configured to receive at least one thumbnail image corresponding to the video content from content provider 130. As referenced herein, the at least one thumbnail image may be selected, by content provider 130, from among a plurality of frames of the video content based at least in part on respective viewing ratings for lots of the frames of the video content. Thus, the at least one thumbnail image may be associated with a respective viewing ratings, and a size or a position of the at least one thumbnail image is determined based at least in part on the respective viewing rate by remote controller 110 or content provider 130. For example, respective viewing ratings may represent a number of viewers or television devices that watched or played respective frames of the video content.

Display unit 530 may be a component or module that is programmed and/or configured to display progress dial 220 and at least one of thumbnail images 232 to 236. The at least one thumbnail image may be associated with at least one point in time represented on the progress dial, thus each of the at least one point in time represented on the progress dial may correspond to the at least one respective thumbnail image.

Progress dial 220 may represent playing progress of the video content. By way of example, a circumference of the progress dial may correspond to the running or playing time of the video content. When playing of the video content is half done, half of the progress dial may be displayed in a different manner with the other half of the progress dial. Further similarly, at least one thumbnail image corresponding to half of the progress dial may be displayed in a different manner with the other thumbnail image(s) corresponding to the other half of the progress dial.

Display unit 530 may be further programmed and/or configured to display preview thumbnail 240. When UI 105 receives a user input that clicks, selects, or otherwise activates a current point in time on the progress dial, transmitter 540 may be configured to transmit, to content provider 130, a request for preview thumbnail 240 corresponding to the current point in time on the progress dial. For example, content provider 130 may transmit requested preview thumbnail 240 to remote controller 110, and receiver 520 may receive requested preview thumbnail 240 from content provider 130. In some embodiments, content provider 130 may transmit, to television device 120, preview thumbnail 240 to allow television device 120 to also display preview thumbnail 280. Alternatively, receiver 520 receiving requested preview thumbnail 240, transmitter 540 may transmit, to television device 120, information regarding preview thumbnail 240 to allow television device 120 to also display preview thumbnail 280.

Similarly, when UI 105 receives a user input that clicks, selects, or otherwise activates the current point in time on the progress dial, transmitter 540 may be configured to transmit, to content provider 130, a request for information regarding preview thumbnail 240. Then, receiver 520 may receive the information regarding preview thumbnail from content provider 130, and display unit 530 may display the information regarding preview thumbnail 240, such as an identifier for the video content, actors or characters displayed in the video content, the point in time and a viewing ratings corresponding to preview thumbnail 240, etc.

Further, when UI 105 receives a user input that clicks, selects, or otherwise activates one of the at least one thumbnail image, display unit 530 may display the clicked, selected, or otherwise activated thumbnail image as preview thumbnail 240. For example, there is no need to transmit, to content provider 130, the request for preview thumbnail 240, because receiver 520 has already received the clicked, selected, or otherwise activated thumbnail image.

When UI 105 receives a user input that clicks, selects, or otherwise activates displayed preview thumbnail 240, control signal generator 550 may be configured to generate a control signal and transmitter 540 may be configured to transmit the control signal to television device 120. For example, television device 120 may play the video content from the point in time corresponding to preview thumbnail 240 in response to receiving of the control signal.

Database 560 may be configured to store data, including data input to or output from the components of remote controller 110. Non-limiting examples of such data may include the information regarding preview thumbnail 240 which is received by receiver 520.

Further, by way of example, database 560 may be embodied by at least one of a hard disc drive, a ROM (Read Only Memory), a RAM (Random Access Memory), a flash memory, or a memory card as an internal memory or a detachable memory of remote controller 110.

Thus, FIG. 5 shows an example configuration of a remote controller on which UI 105 may control at least portions of video content play, in accordance with embodiments described herein.

Figure 6:
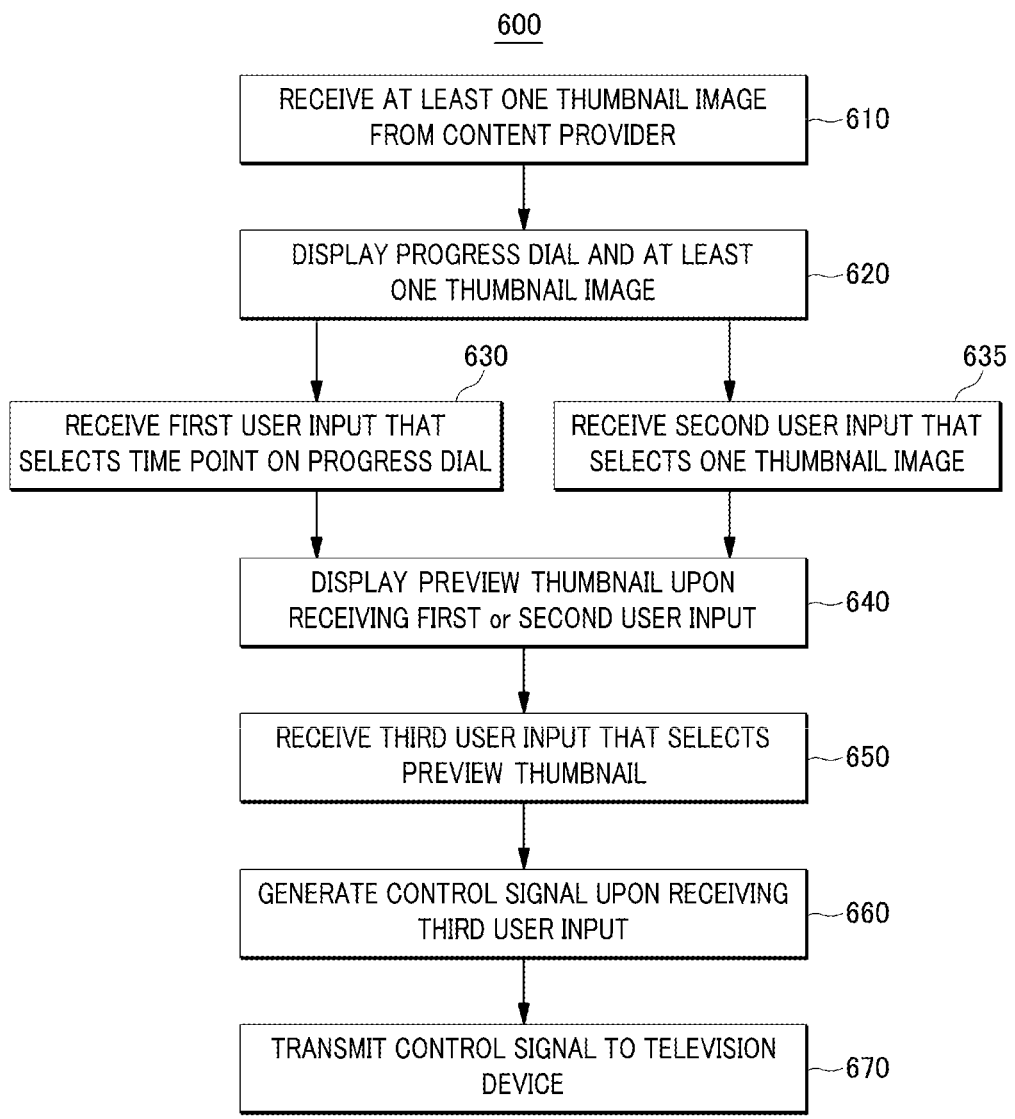
FIG. 6 shows an example processing flow of operations to implement at least portions of video content play control may be implemented by a UI displayed on a remote controller, in accordance with embodiments described herein.

FIG. 6 shows an example processing flow of operations to implement at least portions of video content play control may be implemented by UI 105 displayed on remote controller 110, in accordance with embodiments described herein. The operations of processing flow 600 may be implemented in system configuration 100 including remote controller 110, television device 120 and content provider 130, as illustrated in FIG. 1. Processing flow 600 may include one or more operations, actions, or functions as illustrated by one or more blocks 610, 620, 630, 635, 640, 650, 660 and/or 670. Although illustrated as discrete blocks, various blocks may be divided into additional blocks, combined into fewer blocks, or eliminated, depending on the desired implementation. Processing may begin at block 610.

Block 610 (Receive at least one Thumbnail Image) may refer to remote controller 110 receiving at least one of thumbnail images 232 to 236 from content provider 130. As referenced herein, the at least one thumbnail image may correspond to the video content that is played on television device 120. Processing may proceed from block 610 to block 620.

Block 620 (Display Progress Dial and at least one Thumbnail Image) may refer to remote controller 110 displaying progress dial 220 and the at least one received thumbnail image. Processing may proceed from block 620 to block 630 or block 635. That is, when UI 105 receives a user input that selects a particular time point on the displayed progress dial, processing may proceed from block 620 to block 630; when UI 105 receives a user input that selects one of the at least one displayed thumbnail image, processing may proceed from block 620 to block 635.

Block 630 (Receive User Input that Selects Time Point on Progress Dial) may refer to remote controller 110 receiving a first user input that selects the time point represented on the displayed progress dial. Processing may proceed from block 630 to block 640.

Block 640 (Display Preview Thumbnail) may refer to remote controller 110 displaying preview thumbnail 240 corresponding to the selected time point upon receiving the first user input. As referenced herein, to display preview thumbnail 240, remote controller 110 may transmit a request for preview thumbnail 240 to content provider 130 and receive preview thumbnail 240 from content provider 130.

Block 635 (Receive User Input that Selects One Thumbnail Image) may refer to remote controller 110 receiving a second user input that selects one thumbnail image from among the at least one thumbnail image. Processing may proceed from block 635 to block 640.

Block 640 (Display Preview Thumbnail) may refer to remote controller 110 displaying selected one thumbnail image as preview thumbnail 240 upon receiving the second user input.

In some embodiments, block 640 may further refer to remote controller 110 displaying preview thumbnail 240 with information regarding displayed preview thumbnail 240 upon receiving the first user input or the second user input. To display the information regarding displayed preview thumbnail 240, remote controller 110 may transmit a request for the information regarding displayed preview thumbnail 240 to content provider 130, and receive the requested information regarding displayed preview thumbnail 240. Processing may proceed from block 640 to block 650.

Block 650 (Receive User Input that Selects Preview Thumbnail) may refer to remote controller 110 receiving a third user input that selects displayed preview thumbnail 240. Processing may proceed from block 650 to block 660.

Block 660 (Generate Control Signal) may refer to remote controller 110 generating a control signal upon receiving the third user input to control the playing of the video content. Processing may proceed from block 660 to block 670

Block 670 (Transmit Control Signal) may refer to remote controller 110 transmitting the generated control signal to television device 120. Then, television device 120 may play the video content from a time point corresponding to selected preview thumbnail 240.

Thus, FIG. 6 shows an example processing flow of operations to implement at least portions of video content play control may be implemented by UI 105 displayed on remote controller 110, in accordance with embodiments described herein.

Figure 7:
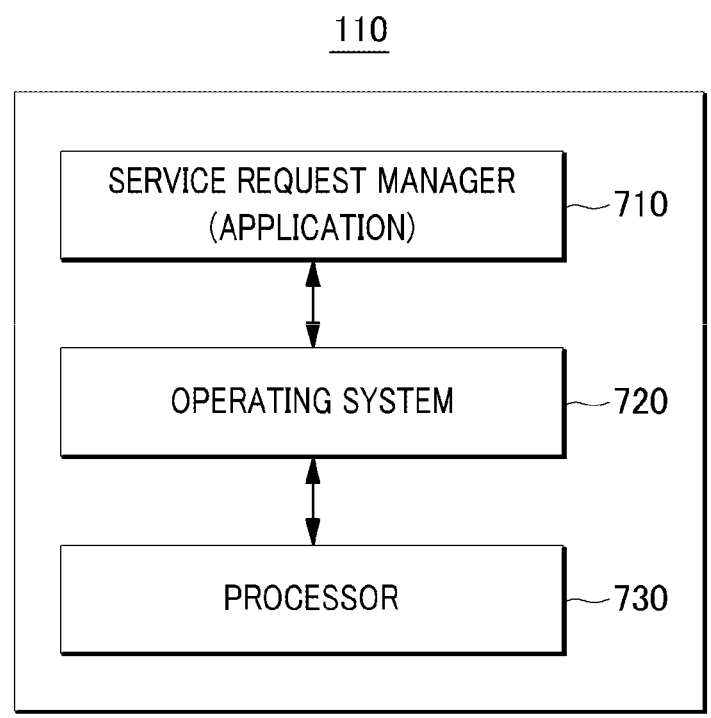
FIG. 7 shows still another example configuration of a remote controller on which a UI may control at least portions of video content play, in accordance with embodiments described herein.

FIG. 7 shows still another example configuration of remote controller 110 on which UI 105 may control at least portions of video content play, in accordance with embodiments described herein. As depicted in FIG. 7, remote controller 110, which is described above with regard to FIGS. 1-6, may include a service request manager 710, an operating system 720 and a processor 730.

Service request manager 710 may be an application configured to operate on operating system 720 such that the video content controlling scheme as described herein may be implemented.

Operating system 720 may allow service request manager 710 to manipulate processor 730 to implement the video content controlling scheme as described herein.

Figure 8:
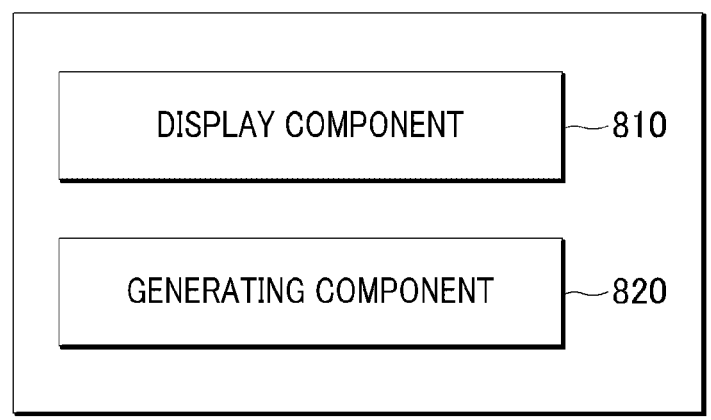
FIG. 8 shows an example configuration of a service request manager by which a UI on a remote controller may control at least portions of a video content control scheme, in accordance with embodiments described herein.

FIG. 8 shows an example configuration of a service request manager by which UI 105 on remote controller 110 may control at least portions of a video content control scheme, in accordance with embodiments described herein. As depicted, service request manager 710 may include a display component 810 and a generating component 820.

Display component 810 may be configured to display a progress dial and at least one thumbnail image. As set forth above, the progress dial represents a playing progress of the video content. Thus, the progress dial allow a user of remote controller 110 to identify current time point of the video content played on television device 120 relative to running time of the video content.

Further, display component 810 may be configured to display preview thumbnail 240 corresponding to a time point on the progress dial when UI 105 receives a user input that selects the time point on the progress dial. In some embodiment, display component 810 may display one thumbnail image as preview thumbnail 240 when UI 105 receives a user input that selects the thumbnail image from among the at least one thumbnail image.

Subsequently, display component 810 may be further configured to display information regarding displayed preview thumbnail 240.

Generating component 820 may be configured to generate a control signal upon receiving a user input to select preview thumbnail 240, as referenced herein, and the control signal may include a request to play the video content from a time point corresponding to preview thumbnail 240.

Thus, FIG. 7 shows still another example configuration of remote controller 110 on which UI 105 may control at least portions of video content play, and FIG. 8 shows an example configuration of a service request manager 710 by which UI 105 on remote controller 110 may control at least portions of a video content control scheme, in accordance with embodiments described herein.

Figure 9:
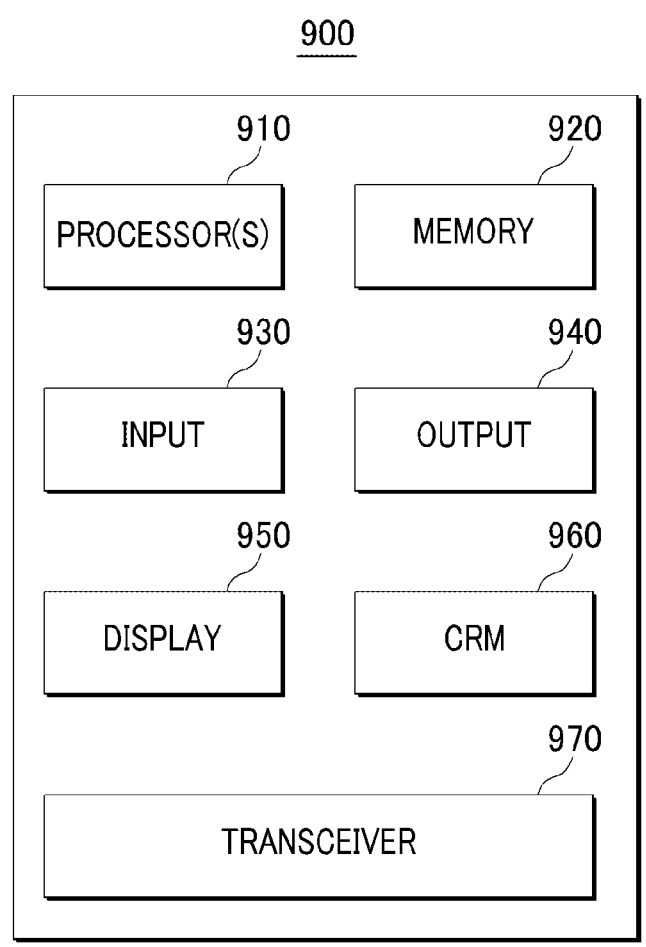
FIG. 9 shows an illustrative computing embodiment, in which any of the processes and sub-processes of a video content controlling scheme using a UI displayed on a remote controller may be implemented as computer-readable instructions stored on a computer-readable medium.

FIG. 9 shows an illustrative computing embodiment, in which any of the processes and sub-processes of a video content controlling scheme using UI 105 displayed on remote controller 110 may be implemented as computer-readable instructions stored on a computer-readable medium. The computer-readable instructions may, for example, be executed by a processor of a device, as referenced herein, having a network element and/or any other device corresponding thereto, particularly as applicable to the applications and/or programs described above corresponding to the example system configuration 100 for transactional permissions.

In a very basic configuration, a computing device 900 may typically include, at least, one or more processors 910, a system memory 920, one or more input components 930, one or more output components 940, a display component 950, a computer-readable medium 960, and a transceiver 970.

Processor 910 may refer to, e.g., a microprocessor, a microcontroller, a digital signal processor, or any combination thereof.

Memory 920 may refer to, e.g., a volatile memory, non-volatile memory, or any combination thereof. Memory 920 may store, therein, an operating system, an application, and/or program data. That is, memory 920 may store executable instructions to implement any of the functions or operations described above and, therefore, memory 920 may be regarded as a computer-readable medium.

Input component 930 may refer to a built-in or communicatively coupled keyboard, touch screen, or telecommunication device. Alternatively, input component 930 may include a microphone that is configured, in cooperation with a voice-recognition program that may be stored in memory 930, to receive voice commands from a user of computing device 900. Further, input component 920, if not built-in to computing device 900, may be communicatively coupled thereto via short-range communication protocols including, but not limitation, radio frequency or Bluetooth.

Output component 940 may refer to a component or module, built-in or removable from computing device 900, that is configured to output commands and data to an external device.

Display component 950 may refer to, e.g., a solid state display that may have touch input capabilities. That is, display component 950 may include capabilities that may be shared with or replace those of input component 930.

Computer-readable medium 960 may refer to a separable machine readable medium that is configured to store one or more programs that embody any of the functions or operations described above. That is, computer-readable medium 960, which may be received into or otherwise connected to a drive component of computing device 900, may store executable instructions to implement any of the functions or operations described above. These instructions may be complimentary or otherwise independent of those stored by memory 920.

Transceiver 970 may refer to a network communication link for computing device 900, configured as a wired network or direct-wired connection. Alternatively, transceiver 970 may be configured as a wireless connection, e.g., radio frequency (RF), infrared, Bluetooth, and other wireless protocols.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

I claim:

1. A system, comprising:
a content provider configured to transmit video content and at least one thumbnail image corresponding to the video content;
a remote controller configured to:
receive the at least one thumbnail image corresponding to the video content from the content provider,
display, on a first area, a progress dial, and
display the at least one thumbnail image associated with at least one time point on the progress dial; and
a television device configured to:
receive, from the content provider, the video content and the at least one thumbnail image of the video content, and
play the video content,
display a progress bar of the video content, and
display the at least one thumbnail image associated with at least one time point on the progress bar.

2. The system of claim 1, wherein the progress dial and the progress bar represent playing progress of the video content, and
wherein the progress dial displayed on the remote controller corresponds to the progress bar displayed on the television device.

3. The system of claim 1, wherein the remote controller is a mobile device on which an application paired with the television device is hosted.

4. The system of claim 1, wherein the remote controller is further configured to display, on a second area, a current thumbnail upon receiving a user input that selects a point on the progress dial.

5. The system of claim 4, wherein the remote controller is further configured to transmit, to the content provider, a request for the current thumbnail corresponding to the selected point, and
wherein the content provider is further configured to transmit the current thumbnail to the remote controller.

6. The system of claim 4, wherein the television device is further configured to play the video content starting from a time point corresponding to the current thumbnail when the remote controller receives a user input that selects the current thumbnail displayed on the second area.

7. The system of claim 1, wherein the content provider is further configured to store viewing ratings corresponding to respective frames of the video content.

8. The system of claim 7, wherein the viewing ratings represent a number of viewers who watched the respective frames of the video content.

9. The system of claim 7, wherein the content provider is configured to select and to transmit the at least one thumbnail image based at least in part on the stored viewing ratings.

10. The system of claim 7, wherein the content provider is configured to determine a size or a position of the at least one thumbnail image displayed on the remote controller and/or the television device based at least in part on the respective viewing rate.

11. A remote controller, comprising:
a pairing unit configured to communicatively pair the remote controller with a television device;
a receiver configured to receive, from a content provider, at least one thumbnail image corresponding to video content that is played on the television device; and
a display unit configured to display, on a first area, a progress dial and the at least one thumbnail image associated with at least one point in time represented on the progress dial,
wherein the at least one thumbnail image is also provided to the television device by the content provider.

12. The remote controller of claim 11, wherein the progress dial represents playing progress of the video content.

13. The remote controller of claim 11, wherein each of the at least one thumbnail image is associated with a respective viewing ratings, and
a size of the at least one thumbnail image is determined based at least in part on the respective viewing rate.

14. The remote controller of claim 13, wherein the respective viewing ratings represent a number of viewers who watched respective frames of the video content.

15. The remote controller of claim 11, wherein the display unit is configured to further display, on a second area, a current thumbnail upon receiving a user input that selects a current point in time, corresponding to the current thumbnail, represented on the progress dial.

16. The remote controller of claim 15, further comprising:
a transmitter configured to transmit, to the television device, information regarding the current thumbnail to allow the television device to also display the current thumbnail.

17. The remote controller of claim 15, wherein the display unit is configured to further display the information regarding the current thumbnail, which includes at least one of an identifier for the video content, characters displayed in the video content, a point in time and a viewing ratings corresponding to the current thumbnail.

18. The remote controller of claim 15, further comprising:
a control signal generator configured to generate a control signal based on a user input that selects the current thumbnail; and a transmitter configured to transmit the control signal to the television device to allow the television device to play the video content from a point in time corresponding to the current thumbnail.

19. The remote controller of claim 11, wherein, from among the at least one thumbnail image, one thumbnail image corresponding to a frame of the video content that has been played by the television device is displayed differently from another thumbnail image corresponding to another frame of the video content that has not been played by the television device.

20. The remote controller of claim 15, wherein the at least one thumbnail image is also displayed on the second area upon receiving a user input that selects the at least one thumbnail image.

* * * * *